United States Patent [19]

Kobayashi

[11] Patent Number: 4,505,413

[45] Date of Patent: Mar. 19, 1985

[54] DUAL CAPSTAN DRIVE UNIT FOR A TAPE RECORDER

[75] Inventor: Kazutoshi Kobayashi, Tokorozawa, Japan

[73] Assignee: Nakamichi Corporation, Tokyo, Japan

[21] Appl. No.: 550,797

[22] Filed: Nov. 14, 1983

[30] Foreign Application Priority Data

Nov. 29, 1982 [JP] Japan .................................. 57-209187

[51] Int. Cl.$^3$ ............................................ B65H 17/42
[52] U.S. Cl. .................................... 226/108; 226/188; 242/206; 360/96.2
[58] Field of Search ............... 226/108, 111, 181, 182, 226/183, 188, 190, 4, 25; 242/206, 208–210; 318/6, 7; 360/71, 73, 96.2

[56] References Cited

U.S. PATENT DOCUMENTS

| | | | |
|---|---|---|---|
| 3,419,202 | 12/1968 | Maxey | 226/25 |
| 3,861,573 | 1/1975 | Kawasaki et al. | 226/25 |
| 4,153,918 | 5/1979 | Jenkins | 360/93 |
| 4,355,750 | 10/1982 | Saitou | 226/188 |
| 4,431,950 | 2/1984 | Bingaman | 318/7 |

Primary Examiner—Leonard D. Christian
Attorney, Agent, or Firm—Pearne, Gordon, Sessions, McCoy, Granger & Tilberry

[57] ABSTRACT

This invention relates to an improvement in a dual capstan drive unit for a reversible tape recorder. A dual capstan drive unit has means to generate variable frequency signals varying in their frequencies corresponding to the revolution speed of first and second capstans which serve to transport a magnetic tape. A single clock oscillator feeds two frequency dividers to produce first and second slightly different reference frequency signals to produce a slight difference between the peripheral speeds of upstream and downstream capstans to maintain tape tension for both tape directions. Control means to controls the revolution of the first and second capstans and compares the detected frequency signals with the respective reference frequency signals so that the revolution of the first and second capstans have a predetermined value. In this invention, the first and second capstans have an outer diameter different from each other and the generated frequency signals have equal frequencies when the peripheral speeds of the two capstans are equal.

1 Claim, 1 Drawing Figure

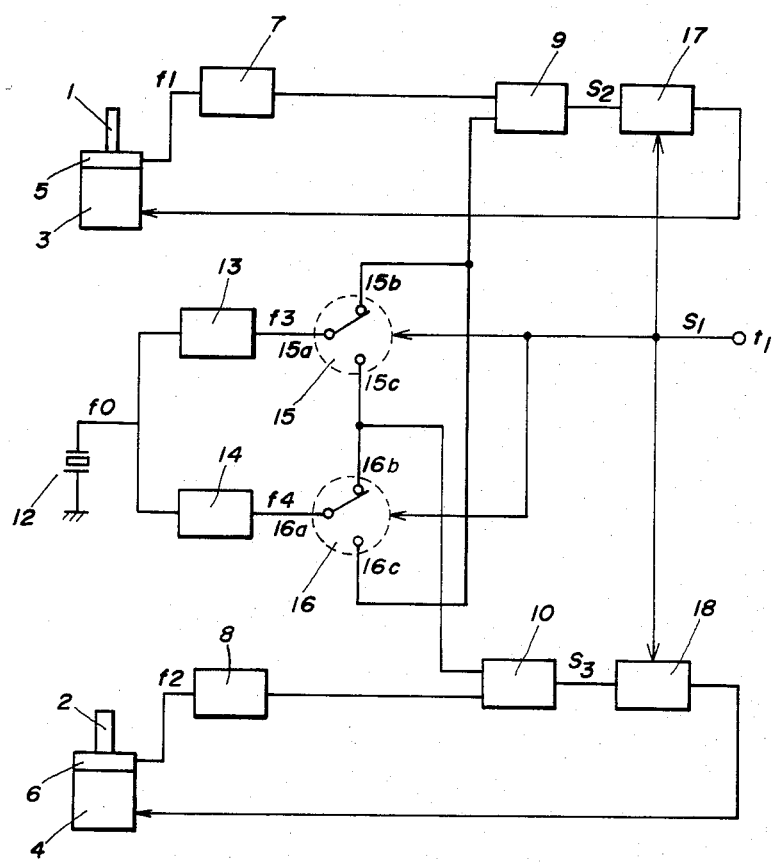

DUAL CAPSTAN DRIVE UNIT FOR A TAPE RECORDER

BACKGROUND OF THE INVENTION

A prior art dual capstan drive unit for a tape recorder has controlled the revolution speed of two capstans by comparing variable frequency signals generated in response to revolutions of the capstans with reference frequency signals from respective oscillators. The drive unit may be applied to a dual capstan type reversible tape recorder. In case the two capstans have the same outer diameter and the generated frequencies are equal to each other when two capstans rotate at the same speed, two different reference frequency signals may be established corresponding to upstream and downstream capstans for obtaining a given tape tension and switched in accordance with the direction of transport of a magnetic tape so that each peripheral speed of the upstream and downstream captans can be set at the same speed in both directions of the tape transport. However, in case the capstans have the outer diameter different from each other, two different reference frequency signals are required in each of the directions of the tape transport. Thus, it will be noted that additional oscillators and frequency dividers are required, and as a result the drive unit is disadvantageously uneconomical.

SUMMARY OF THE INVENTION

Accordingly, it is a principal object of the invention to provide a dual capstan drive unit reversible tape recorder in which a magnetic tape can be transported by two capstans of different outer diameters at an accurate speed and have a predetermined tension without additional oscillators and frequency dividers.

In accordance with the invention, there is provided a dual capstan drive unit for a reversible tape recorder in which a magnetic tape is reversibly transported by first and second capstans in both forward and reverse directions comprising said first and second capstans having outer diameters different from each other, first and second driving means to reversibly rotate said first and second capstans, respectively, in accordance with the direction of the desired tape transport, means to generate first and second variable frequency signals varying in their frequencies corresponding to the rotational speed of said first and second capstans, respectively, and with frequencies of said generated first and second variable frequency signals being set equal to each other when said first and second capstans rotate at the same peripheral speed, means to generate first and second reference frequency signals having a frequency different from each other for providing a difference between the peripheral speeds of the upstream and downstream capstans relative to said direction of the tape transport, means to compare frequencies of said first and second variable frequency signals with those of said first and second reference frequency signals, respectively, control means to control said first and second driving means so that each frequency of said first and second variable frequency signals substantially coincides with that of said first and second reference frequency signals, and switching means to switch a comparing correlation between said first and second variable frequency signals and said first and second reference frequency signals in accordance with the direction of the tape transport.

BRIEF DESCRIPTION OF THE DRAWING

The above and other objects and features of the invention will be apparent from the description of the embodiment taken with reference to the drawing in which;

The single FIGURE schematically illustrates a circuit constructed in accordance with an embodiment of the invention.

DETAILED DESCRIPTION OF THE EMBODIMENT

With reference to the single FIGURE, there is shown a circuit of a dual capstan drive unit for a reversible tape recorder constructed in accordance with an embodiment of the invention. The dual capstan drive unit serves to drive first and second capstans 1 and 2 which comprise rotary shafts of electric motors 3 and 4, respectively, to transport a magnetic tape not shown. The electric motors 3 and 4 are driven by first and second motor drive circuits 17 and 18 described later. The drive unit comprises means to generate variable frequency signals f1 and f2 varying in their frequencies corresponding to revolutions of the first and second capstans 1 and 2. In the illustrated embodiment, the means to generate the variable frequency signals may comprise first and second frequency generators 5 and 6 coaxially mounted on the rotary shafts of the electric motors 3 and 4.

As noted from the FIGURE, the first and second capstans 1 and 2 have an outer diameter different from each other so as to form a frequency dispersion type dual capstan. It will be understood by those skilled in the art that this will cause wow and flutter to be reduced.

It should be noted that the frequency generators 5 and 6 have the number of teeth therein different from each other so as to generate output signals of the same frequency when the capstans 1 and 2 rotate at the same peripheral speed.

First and second wave reformers 7 and 8 serve to convert the waves of the output signals of frequencies f1 and f2 generated by the frequency generators 5 and 6 respectively into square waves. An output signal from the first wave reformer 7 is supplied to one of the inputs of a first phase comparator 9 while an output signal from the second wave reformer 8 is supplied to one of the inputs of a second phase comparator 10.

A clock oscillator 12 has an output signal of generated frequency f0. The frequency of the output signal from the oscillator 12 is divided by first and second frequency dividers 13 and 14 into a first reference frequency f3 for controlling the upstream capstan and for determining the transport speed of a magnetic tape and a second reference frequency f4 higher than the first reference frequency f3 for controlling the downstream capstan for providing a tension to the magnetic tape. These reference frequency signals are supplied to movable contacts 15a and 16a of first and second switching circuits 15 and 16.

A tape transporting direction switching signal S1 is supplied to an input terminal t1 to control the first and second switching circuits 15 and 16 so as to connect the movable contacts 15a and 16a to stationary contacts 15b and 16b, respectively, when the magnetic tape is to be transported in a forward direction and to stationary contacts 15c and 16c, respectively, when the magnetic tape is to be transported in a reverse direction.

The stationary contacts 15b and 16c of the switching circuits 15 and 16 are connected to the other input terminal of the first phase comparator 9 while the stationary contacts 15c and 16b are connected to the other input terminal of the second phase comparator 10. Accordingly, when the magnetic tape is to be transported in the forward direction, the first phase comparator 9 compares the generated frequency f1 from the first frequency generator 5 for the capstan 1 as the upstream capstan with the first reference frequency f3 from the first frequency divider 13 while the second phase comparator 10 compares the generated frequency f2 from the second frequency generator 6 for the capstan 2 as the downstream capstan with the second reference frequency f4 from the second frequency divider 14. When the magnetic tape is to be transported in the reverse direction, the first phase comparator 9 compares the generated frequency f1 from the first frequency generator 5 for the capstan 1 as the downstream capstan with the second reference frequency f4 from the second frequency divider 14 while the second phase comparator 10 compares the generated frequency f2 from the second frequency generator 6 for the capstan 2 as the upstream capstan with the first reference frequency f3 from the first frequency divider 13.

Error signals S2 and S3 from the first and second phase comparators 9 and 10 are supplied to the first and second motor drive circuits 17 and 18, respectively. Thus, it will be noted that the electric motors 3 and 4 are controlled so that the generated frequencies f1 and f2 from the frequency generators 5 and 6 become equal to the corresponding reference frequencies f3 and f4 from the frequency dividers 13 and 14. Also, since the tape transporting direction switching signal S1 is supplied to the first and second motor drive circuits 17 and 18, the polarity of the voltage supplied to the electric motors 3 and 4 is inverted in accordance with the direction in which the magnetic tape is transported.

It should be noted that the dual capstan drive unit of the invention can transport with magnetic tape at an accurate transporting speed and with a predetermined tension in either of the forward and reverse directions without additional oscillators and frequency dividers.

While a preferred embodiment of the invention has been described and illustrated with reference to the accompanying drwaing, it will be understood that it is by way of example, and that various changes and modifications may be made without departing from the spirit and scope of the invention, which is intended to be defined only by the appended claim.

What is claimed is:

1. A dual capstan drive unit for a reversible tape recorder in which a magnetic tape is reversibly transported by first and second capstans in both forward and reverse directions comprising:

said first and second capstans having outer diameters different from each other;

first and second driving means to reversibly rotate said first and second capstans, respectively, in accordance with the direction of the desired tape transport;

means to generate first and second variable frequency signals varying in their frequencies corresponding to the rotational speed of said first and second capstans, respectively, and with frequencies of said generated first and second variable frequency signals being set equal to each other when said first and second capstans rotate at the same peripheral speed;

means to generate first and second reference frequency signals having a frequency different from each other for providing a difference between the peripheral speeds of the upstream and downstream capstans relative to said direction of the tape transport;

means to compare frequencies of said first and second variable frequency signals with those of said first and second reference frequency signals, respectively;

control means to control said first and second driving means so that each frequency of said first and second variable frequency signals substantially coincides with that of said first and second reference frequency signals; and switching means to switch a comparing correlation between said first and second variable frequency signals and said first and second reference frequency signals in accordance with the direction of the tape transport.

* * * * *

UNITED STATES PATENT AND TRADEMARK OFFICE
CERTIFICATE OF CORRECTION

PATENT NO. : 4,505,413
DATED : March 19, 1985
INVENTOR(S) : Kazutoshi Kobayashi

It is certified that error appears in the above-identified patent and that said Letters Patent are hereby corrected as shown below:

In the Abstract:

Line 12, delete "to"
Line 12, after "revolution" insert --speed--
Line 13, delete "detected" and insert --generated--
Line 15, after "revolution" insert --speed--

Column 3, line 36, delete "supplied" and insert --applied--
Column 3, line 40, delete "with" and insert --the--

Signed and Sealed this

Eighth Day of April 1986

[SEAL]

Attest:

DONALD J. QUIGG

Attesting Officer

Commissioner of Patents and Trademarks